(12) United States Patent
Dickinson et al.

(10) Patent No.: US 6,501,846 B1
(45) Date of Patent: Dec. 31, 2002

(54) METHOD AND SYSTEM FOR COMPUTER ACCESS AND CURSOR CONTROL USING A RELIEF OBJECT IMAGE GENERATOR

(75) Inventors: Alexander G. Dickinson, Laguna Beach, CA (US); Andrew Cole, Sebastian, FL (US); John A. McMorris, III, Indialantic, FL (US); Shahin Hadjiabadi, Vero Beach, FL (US); Fredric F. Derwitsch, Melbourne, FL (US); Paul F. Vachris, Palm Bay, FL (US); Steven J. Marteney, Melbourne, FL (US); Ronald S. Smith, Palm Bay, FL (US); Gregory A. Mullins, Melbourne, FL (US)

(73) Assignee: Ethentica, Inc., Aliso Viejo, CA (US)

( * ) Notice: Subject to any disclaimer, the term of this patent is extended or adjusted under 35 U.S.C. 154(b) by 0 days.

(21) Appl. No.: 09/066,625

(22) Filed: Apr. 24, 1998

Related U.S. Application Data

(60) Provisional application No. 60/066,814, filed on Nov. 26, 1997.

(51) Int. Cl.[7] .................................................. G06K 9/00
(52) U.S. Cl. ........................ 382/124; 382/127; 345/156; 345/45
(58) Field of Search ................................ 382/124–127; 345/104, 163, 36, 45, 102, 121, 145, 156, 157, 173

(56) References Cited

U.S. PATENT DOCUMENTS

| | | |
|---|---|---|
| 3,944,978 A | 3/1976 | Jensen et al. |
| 4,322,163 A | 3/1982 | Schiller |

(List continued on next page.)

FOREIGN PATENT DOCUMENTS

| | | | |
|---|---|---|---|
| EP | 0 345 368 | 12/1989 | |
| EP | 0 455 401 | 11/1991 | |
| EP | 0 756 334 | 1/1997 | |
| WO | WO 97/16834 | 5/1997 | |
| WO | 99/00761 | * 1/1999 | ................. 382/124 |

OTHER PUBLICATIONS

Database WPI, Abstract Page, Jan. 28, 1981.
Database WPI, Abstract Page, Jul. 15, 1982.
Patent Abstracts of Japan, Publication No. 02126381, Publication Date May 15, 1990.

*Primary Examiner*—Bhavesh Mehta
(74) *Attorney, Agent, or Firm*—Stradling Yocca Carlson & Rauth LLC; John Eldredge, Esq.

(57) ABSTRACT

A system and method for using a relief object image generator for cursor control, computer access control, and operational parameter control is disclosed. The system includes a relief object image generator, a sensor array, an image processor, and a memory. The relief object image generator generates images of relief objects, such as fingerprints, brought in proximity of the exposed surface of the image generator. The image processor receives the image from the sensor array, processes the image, and compares the resulting descriptive information to stored information corresponding to authorized users. If a match is found, the user is granted access to the computer. The image processor may also process the image to determine image movement or the image's presence or absence. Detected movement is used to generate directional signals while the presence and absence of the image is used to generate highlight and select signals. These signals conform to those generated by known mouse devices so the system of the present invention can replace a position variable device in the keyboard of a laptop or other portable computer without sacrificing functionality for the system. Other uses of the system disclosed herein include control of operational parameters for a device such as brightness and contrast for a monitor and the transmission of relief object images to remote sites for authentication of a user.

79 Claims, 6 Drawing Sheets

U.S. PATENT DOCUMENTS

| | | |
|---|---|---|
| 4,340,300 A | 7/1982 | Ruell |
| 4,358,677 A | 11/1982 | Ruell et al. |
| 4,385,831 A | 5/1983 | Ruell |
| 4,414,684 A | 11/1983 | Blonder |
| 4,428,670 A | 1/1984 | Ruell et al. |
| 4,569,080 A | 2/1986 | Schiller |
| 4,624,798 A | 11/1986 | Gindrup et al. |
| 4,827,527 A | 5/1989 | Morita et al. |
| 5,096,290 A | 3/1992 | Ohta |
| 5,177,353 A | 1/1993 | Schiller |
| 5,189,482 A | 2/1993 | Yang |
| 5,209,967 A | 5/1993 | Wright et al. |
| 5,210,588 A | 5/1993 | Lee |
| 5,222,153 A | 6/1993 | Beiswenger |
| 5,519,785 A | 5/1996 | Hara |
| 5,781,651 A * | 7/1998 | Hsiao et al. ............... 382/127 |
| 5,838,306 A * | 11/1998 | O'Connor et al. ......... 345/163 |
| 5,875,269 A * | 2/1999 | Yamashita et al. ......... 382/313 |
| 5,952,998 A * | 9/1999 | Clancy et al. ............ 345/173 |
| 6,002,786 A * | 12/1999 | Hallibert et al. ........... 382/124 |
| 6,091,838 A * | 7/2000 | Burrows et al. ........... 382/124 |
| 6,144,757 A * | 11/2000 | Fukuzumi ................. 382/124 |

* cited by examiner

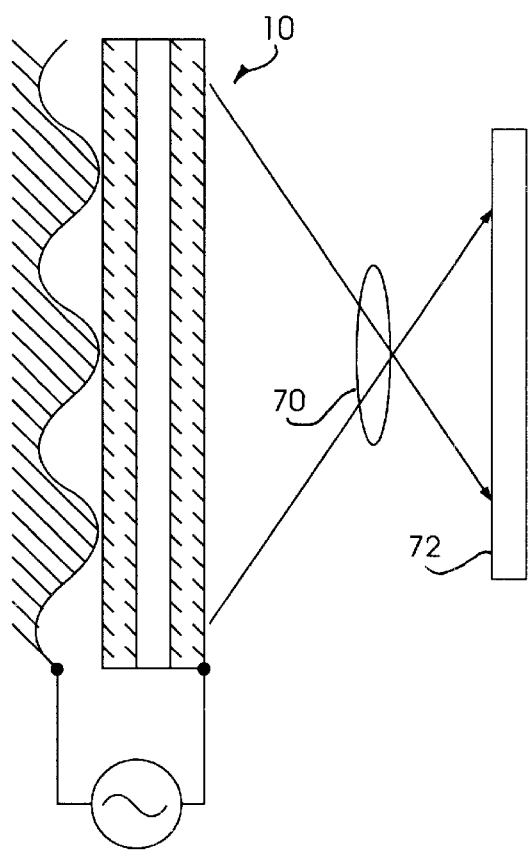
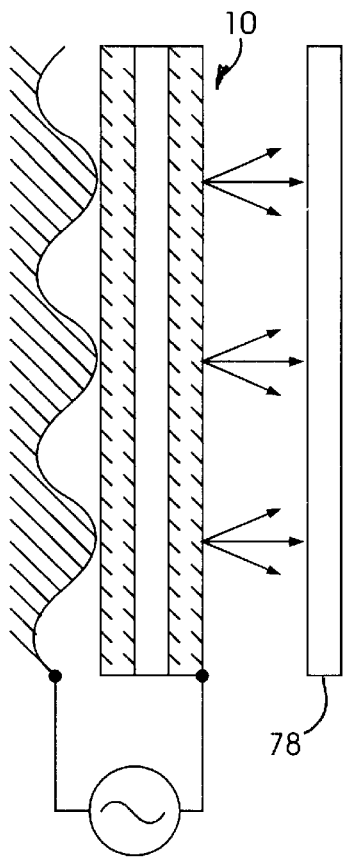
FIG. 4  FIG. 5
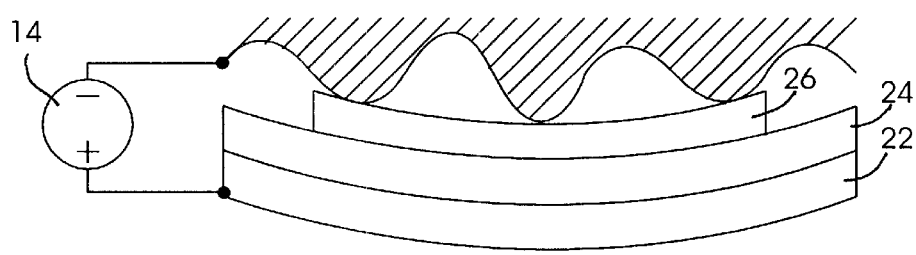
FIG. 1A

METHOD AND SYSTEM FOR COMPUTER ACCESS AND CURSOR CONTROL USING A RELIEF OBJECT IMAGE GENERATOR

This application claims the benefit of U.S. Provisional Application No. 60/066,814 filed on Nov. 26, 1997.

FIELD OF THE INVENTION

This invention relates to relief object image generators, and more particularly, to use of relief object image generators with computer systems.

BACKGROUND OF THE INVENTION

Systems for generating images of relief objects are known. Relief objects are objects having a surface with features typically formed by areas and sections lying both within and outside a single two-dimensional geometric plane. A common relief object imaged by known technology is the surface of the human finger which contains ridges and valleys forming a fingerprint. These known systems include a platen to which a relief object is pressed to expose the ridges (areas of the fingerprint which contact the platen) and valleys (areas of the fingerprint which do not contact the platen) of the relief object to imaging equipment. The platen is illuminated by a light source. In many relief object imaging systems, the light from the light source is passed through a collimator before it illuminates the platen. The light is typically coupled through a right-angle prism to the platen at or near an angle corresponding to Total Internal Reflection (TIR). The frustration of TIR and the resulting absorption of light occurs at the ridges of the relief object where the relief object actually makes contact with the platen, thereby creating dark areas corresponding to these ridges. TIR remains undisturbed at the valleys of the relief object where no physical contact with the relief object occurs so illuminated patterns corresponding to the valleys are generated. Thus, light from the light source is modulated by the structural features of the relief object pressed against the platen and this modulated light is transmitted through the platen to an optical system. The optical system is usually comprised of lenses and other optical treating components. The optically treated, modulated light then impinges on a sensor array which converts the optical energy into electrical energy. The intensity at each element of the sensor array is typically converted to a digital value and the values for the array elements may then be processed by a computer for classification or verification of the relief object.

These known relief object imaging systems have a number of disadvantages. For one, each requires a light generating source which must be located at a distance from the platen so that a substantial portion of the platen surface is illuminated by the light source. Additionally, the optically treating elements are typically placed at a distance and angle from the platen to receive the reflected light from the platen. To optimize the benefits of the optical element processing, the optical treating elements must be located at distances from the platen where light rays converge or other known optical physical phenomena occur. Thus, the geometry of known relief object imaging systems impose size constraints which limit the applications for known relief object imaging systems.

Another disadvantage of known imaging systems are distortions of the reflected image. For example, the platen and sensor array in a typical relief object imaging system are tilted to maintain good focus while also maintaining platen illumination near the TIR angle. This tilting causes a type of distortion known as a keystone distortion, which is an apparent shortening of one side of the image due to an asymmetrical magnification factor imposed by this tilt angle. The resulting optical aberration causes the relief object image generator to create a trapezoidal image from a square object. Frequently, this distortion is reduced by interposing optical elements between the sensor array and the platen. However, the interposing of additional optical treating elements exacerbates the geometric constraints for the system and further impacts the applications in which the system may be used.

Known relief object image generating systems are also sensitive to ambient light entering the platen from the surface on which the relief object is placed. Additionally, the presence of an excessive amount of moisture or oil on the relief object alters the modulation of the light by the relief object and may further degrade the image of the relief object in such systems. Likewise, an exaggerated absence of moisture and other fluids in a relief object, such as a fingerprint, may also alter the light modulation produced by the relief object and degrade the image of the relief object. Also, systems which are engineered to address image degradation caused by excessive moisture may not adequately correct degradation caused by excessively dry relief objects and vice versa.

Other known relief object image generators which are not based on light emission principles replicate fingerprint images using direct capacitive coupling between the finger and an electrical sensor. These devices typically suffer from sensitivity to electrostatic discharge environments and can typically be severely damaged through abrasion. The greatest disadvantage with these devices is the cost of these relief object image generators which render the wide scale integration of these devices into computer systems economically impractical.

Computer security is an increasingly important concern as computers become smaller and personal computer interconnectivity proliferates. The mobility and enhanced capabilities of computers provide computational resources at sophisticated levels as well as at previously unknown locations and situations. These advancements make unauthorized computer access more likely because effective physical control is more difficult to exercise over small portable computers than stationary computers and open networks like the Internet make logical access to computers easier. One way to frustrate the purpose of computer thieves is to deny them, or the persons to whom they sell the computers, the ability to use the computer. Most computer access control systems use a password or other secret tokens that an authorized user enters to activate a computer system. However, most computer thieves can disable password protection or similar security access features so the computer may be used by someone other than an authorized person. While there are known systems for limiting access to valuable resources by identifying authorized persons with fingerprint imaging systems, known relief object image generators do not possess physical geometrical dimensions which render them compatible with laptop computers and the like for reasons discussed above.

Associated with the increasing need to enhance computer access security is the need to accomplish much of the typical computer/user interface functionality in a more compact, cost effective and ergonomically efficient manner. That is, as the footprint of portable computers decreases, the area available for the keyboard, function keys and cursor control devices also decreases. Thus, a need is arising for a cursor controller that requires less area of a keyboard than known touchpads or that can be integrated with other functional components of a user's keyboard.

What is needed is a relief object imaging system for performing security and access control functions that may be incorporated in different types of computer systems used in a variety of applications.

What is needed is a device that integrates the control of function keys with the function of a cursor control device.

SUMMARY OF THE INVENTION

The above identified limitations and disadvantages of previously known computer access control devices are overcome by a system made in accordance with the principles of the present invention. A computer access control system made in accordance with the principles of the present invention includes a relief object generator which is comprised of a single electrode electroluminescent device coupled to an alternating current source to generate an image corresponding to a relief object placed against the relief object image generator, a sensor array for receiving the generated image and converting the image to electrical signals, a memory for storing image data corresponding to a relief object associated with an authorized user, and an image processor for generating image data corresponding to the electrical signals received from the sensor array and for comparing the stored image data to the generated image data, the image processor generating an access granted signal in response to the stored image corresponding to the generated image data. Preferably, the image data generated by the processor of the access control device is descriptive information that corresponds to the generated image and the image data stored in the memory is descriptive information that corresponds to the relief object image associated with the user.

A computer control device made in accordance with the principles of the present invention includes a relief object image generator coupled to a computer for user access, the relief object image generator for generating images of a relief object brought in proximity to the relief object image generator, a sensor array for receiving the generated images and converting the images to electrical signals corresponding to the received images, and an image processor for converting the electrical signals received from the sensor array to computer control signals. A computer control device made in accordance with the principles of the present invention may control a computer function by processing relief object image changes to generate function select or activation signals. For example, the image processor may generate a select signal in response to the image processor detecting the presence and absence of a relief object image generated by the relief object image generator. As another example, the image processor may control a "click" operation by generating a "click" function control signal in response to the image processor detecting a presence, absence, and renewed presence of a relief object image generated by the relief object image generator. To control operational parameters for a computer system, the image processor of the computer control device of the present invention, may generate an operational parameter control signal in response to movement of a relief object image generated by the relief object image generator. By adding memory to the computer control device and storing information corresponding to authorized individuals, the computer control device may also be used as a computer access control device as described above.

The relief object image generator used in the computer access control device of the present invention has a reduced geometry and the ability to incorporate other functions required for computer operation by using a single electrode electroluminescent device and an electrical current source. The electroluminescent device may be an inorganic or organic electroluminescent device. With an electroluminescent device, the electrical current source has one lead coupled to the single electrode of the electroluminescent device and a second lead coupled to a relief object in proximity to the electroluminescent device. This electroluminescent device provides current to the relief object and the current is strongly coupled from the relief object to the single electrode electroluminescent device by ridges of the relief object while the current is weakly coupled to the electroluminescent device by the valleys of the relief object. Those areas of the electroluminescent device which are strongly coupled to the current from the relief object generate light which is more intense than the areas of the electroluminescent device which are weakly coupled to the current from the relief object. The light generated by the electroluminescent device in correspondence with the valleys and ridges of the relief object forms an optical image of the relief object. The electrodes in known electroluminescent devices are typically planar and are used to provide a light field that corresponds to the aligned areas of the electrodes. By fabricating the electroluminescent device with a single electrode and coupling the current source to a relief object held against the single electrode electroluminescent device, the amount of current coupled to different areas of the electroluminescent device varies in correspondence with the valleys and ridges of the relief object and generates an image of the relief object.

An organic single electrode electroluminescent device creates an image of a relief object as described above. However, as these devices typically require lower voltage but higher current than that required for inorganic electroluminescent devices, they may include a pressure-variable impedance layer and a flexible conductive layer. In this implementation, the second lead of the current source is connected to the flexible conductive layer overlaying the impedance layer such that the pressure generated by the ridges of the relief object pressing against the flexible conductive layer form current paths in the impedance layer and, correspondingly, an image of those ridges. Preferably, direct current (DC) sources are used with organic electroluminescent devices and alternating current (AC) sources are used with inorganic electroluminescent devices.

The optical image generated by the system of the present invention may be processed by optical elements and provided to a sensor array. Typically, the optical elements include reduction lenses which reduce the size of the image and, correspondingly, the size of the sensor array used to convert the image to electrical signals. Sensor arrays used in these embodiments of the present invention may be integrated circuits or the like. Using reduction lenses to reduce the size of the image, and correspondingly, the integrated circuit sensor, saves cost as the integrated circuit is made of silicon which has a cost directly proportional to the physical surface area of the integrated circuit. In another embodiment of the present invention, a one-to-one sensor array is located proximate to the single electrode electroluminescent device. The one-to-one sensor array has a length and width which is approximately the same as the electroluminescent device. The one-to-one sensor array may be made of a semiconductor material on an insulating substrate, such as amorphous silicon on glass. Because the sensor array is proximate to the electroluminescent device, the thickness of the computer access control device of the present invention is substantially smaller than previously known systems that require an optical element to focus light reflected from a platen onto a sensor array. Additionally, the sensor array and electroluminescent device are substantially orthogonal to the path of the light generated by the electroluminescent device. As a result, distortion caused by angular placement of the platen and sensor array in previously known systems is essentially eliminated. The ability of the single electrode electroluminescent device to generate light allows the computer access control device of the present invention to operate without an external light source. This further contributes to the reduced size and complexity of the access control device of the present invention.

In a system of the present invention which uses an inorganic single electrode electroluminescent device, the electroluminescent device includes a transparent electrode layer, a dielectric layer, a light emitting layer which is interposed between a first surface of the transparent electrode layer and a first surface of the dielectric layer, and an alternating current source which has a first lead coupled to the transparent electrode layer and a second lead that is proximate to a second surface of the dielectric layer. While the dielectric layer may be translucent, it, preferably, is substantially opaque to attenuate the amount of light transmitted through the second surface of the dielectric layer that is not generated by the relief object such as ambient light. When a relief object is placed in contact with the second surface of the dielectric layer and is coupled to the second lead of the alternating current source, current is strongly coupled from the ridges of the relief object through the dielectric layer and light emitting layer to the transparent electrode while current is weakly coupled from the valleys of the relief object to the transparent electrode. The light emitting particles in the strongly coupled current path generate light more intensely than those particles in the weakly coupled current path. While the term "transparent" is used to describe the electrode layer of the electroluminescent devices used in the systems made in accordance with the principles of the present invention, the reader should understand that as long as sufficient light is passed by the electrode so a relief object image or descriptive information about a relief object image can be generated, the electrode is adequately "transparent." Thus, the term "transparent" refers to both transparent and translucent materials as those terms are typically understood.

A relief object relief generator used in a computer control device made in accordance with the principles of the present invention does not require an external light source or a collimator as no light is required for platen illumination. Instead, a relief object causes the single electrode electroluminescent device to generate a self-luminous optical image of the relief object when the relief object is coupled to the current source and brought in contact with the single electrode electroluminescent device. Because the light is generated by the structure and not illuminated by a light source, the sensor may be placed directly opposite the transparent electrode of the electroluminescent device. No intervening optical elements are required for treating the light to reduce distortion caused by the angles at which the light source, platen and sensor array are located in previously known systems. As a result, the relief object imaging system is much more compact and may be used in computer systems more easily, economically and efficiently than previously known imaging systems. For example, one embodiment of the present invention may be located on a keyboard of a laptop computer to generate an image of a fingerprint which may be processed to generate descriptive information that is distinctive for the fingerprint. The information may be the image itself or a set of algorithmically derived templates which map repeatable fingerprint characteristics that are unique to the individual to which the fingerprint belongs. The descriptive information is compared to stored fingerprint descriptive information to provide access to the computer or converted to digital information and transmitted to another computer for access to another computer system to verify a financial transaction over a network. Thus, the computer access control device of the present invention may be used to generate descriptive data about a relief object at a remote site or to generate an access granted signal based on a local comparison of the descriptive data with stored data. Either the descriptive data or the access granted signal may be transmitted to another computer coupled to an open network. The second computer may use the transmitted descriptive data to verify that the user associated with the relief object at the remote site is authorized to access the second computer. Consequently, security for logical access to computers coupled to an open network is enhanced.

Another inorganic single electrode electroluminescent device that may be used with systems made in accordance with the principles of the present invention includes a transparent electrode layer, a light emitting layer having an exposed outer surface, and an alternating current source which has a first lead coupled to the transparent electrode layer and a second lead that is proximate to the exposed surface of the light emitting layer. When a relief object is placed in contact with the exposed surface of the light emitting layer and is coupled to the second lead of the alternating current source, current is strongly coupled from the ridges of the relief object through the light emitting layer to the transparent electrode while current is weakly coupled from the valleys of the relief object to the transparent electrode. The light emitting particles in the strongly coupled current path generate light more intensely than those particles in the weakly coupled current path. The capacitive effect provided by the dielectric layer in the embodiment discussed above is provided by the capacitance of the relief object especially when the relief object is a person's finger.

The light emitting layer of the inorganic type of electroluminescent device may include phosphor particles which may be a coating applied and adhered to the first surface of the transparent electrode layer using a binding agent. Alternatively, the light emitting particles may be dispersed throughout a dielectric layer of an inorganic electroluminescent device. In this type of inorganic electroluminescent device, the light emitting particles may also be phosphor particles and the phosphor particles may be encapsulated within a protective dielectric layer to prevent moisture from degrading the phosphor. Preferably, the transparent electrode layer of an inorganic electroluminescent device is comprised of indium tin oxide (ITO) or a zinc oxide:aluminum (ZnO:Al) composite; the phosphor is preferably zinc sulfide:copper (ZnS:Cu) or it may be zinc sulfide:manganese (ZnS:Mn); and the dielectric layer may be barium titanate ($BaTiO_3$). The light emitting layer of this type of inorganic electroluminescent device may also include reflective or refractive particles which cause the light generated by the phosphor to become more directional and, therefore, more concentrated in the direction of the sensor. Empirical measurements indicate that both the frequency and the waveform of the alternating current source may be adjusted to control the contrast between the light generated by the ridges and valleys of the relief object. By adjusting the voltage amplitude of the alternating current source, the average light intensity generated by the phosphors may be varied. Thus, the systems of the present invention using this type of inorganic electroluminescent device provide contrast and intensity control of the light image generated by the relief object image generator.

Another electroluminescent device that may be used with the systems of the present invention includes a pressure-variable impedance layer that covers the dielectric layer, a flexible electrode that covers the variable impedance layer and the second lead from the alternating current source is coupled to the flexible electrode. The variable impedance layer is comprised of conductive and/or capacitive particles dispersed through a non-conducting compressible polymer. Where the ridges of a relief object contact the flexible electrode and generate localized pressure, a conductive path through the impedance layer is formed by bringing conductive/capacitive particles into proximity with one another. Those areas of the flexible electrode proximate and aligned with the valleys of the relief object do not generate significant localized pressure which compresses the conductive/capacitive particles. Thus, the particles remain separated and less current is passed through those portions of the layer. Accordingly, the localized pressure caused by pressing the ridges of the relief object against the flexible electrode provide more current from the alternating current source to the transparent electrode through the dielectric and light emitting layers. Again, the magnitude of the current passing though the light emitting particles determines the intensity of the light for the optical image of the valleys and ridges of the relief object.

Systems using the electroluminescent devices with a pressure-variable impedance layer do not couple current from the alternating current source to the relief object. Instead, the relief object forms conductive/capacitive paths in the variable impedance layer for the current supplied from the flexible electrode. Thus, these systems insulate the relief object from the alternating current. This is especially advantageous for systems incorporating relief object imaging systems that are used in countries having regulations regarding the amount of current to which a person can be exposed. Because pressure from the structure of the relief object generates the conductive/capacitive paths through the variable impedance layer, excessive moisture or dryness does not degrade image contrast as happens in systems where the platen of a relief object image generator must be illuminated.

Systems made in accordance with the principles of the present invention may include an organic electroluminescent device. The structure of the organic electroluminescent device may be comprised of a thin, sublimed molecular film such as tris (8-quinolinolato) aluminum (III), commonly denoted as Alq or a light-emitting polymer with specialized structures which provide positive and negative charge carriers having high mobility. Light-emitting polymers include poly (p-phenylene vinylene) or PPV, soluble polythiophene derivatives, and polyanilene which may be applied to the specialized structure by known coating techniques such as spin or doctor-blade coating.

Because organic electroluminescent devices operate at low voltages, the relatively high self-resistance of common relief objects do not effectively modulate the luminescence generated by the electroluminescent device. If the relief object to be imaged is not capable of withstanding a relatively large voltage drop at currents of at least a few milliamperes, an insulating layer is preferably provided between the relief object and the organic electroluminescent device. Preferably, the insulating layer is a pressure-variable impedance layer such as the one discussed above. The pressure-variable impedance layer selectively provides an electrical impedance which varies in correspondence with the ridges and valleys of the relief object contacting the impedance layer. As a result, the higher level currents may be presented through the lower impedance paths to the organic electroluminescent device to generate holes and electrons which recombine to produce localized photons. More preferably, the organic electroluminescent device is coated with a pixelated low work function metal such as calcium or aluminum to effect efficient electron charge injection. Inventive systems which utilize an organic electroluminescent device provide a relief object image generator which may be powered from a DC current source.

A relief object image generator of the type described above possesses physical geometrical dimensions, relatively lower costs, and environmental robustness which make it compatible with portable computers such as laptop computers, desk-top personal computers, associated peripherals and the like. The relief object image generators discussed above are also compatible with other applications where personal identification numbers (PIN) and passwords are currently used and where volumetric constraints have prevented the practical integration of previously known relief object image generators. Examples of these applications include cellular telephones, keyless entry devices for all applications requiring physical security (including buildings, rooms, automobiles, etc.). Another application where the relief object generators discussed above may be used is a point-of-sale device that verifies a user's identity using information available from a fixed or portable memory. In this application, fixed memory applies to the memory physically resident with the relief object image generator. Portable memory is any information storage media or device which is not physically resident with the relief object image generator but is typically controlled by the user. This includes, but is not limited to, printed data in the form of symbology, optical laser cards, smart chip cards, passive and active RF cards and magnetic stripe cards.

In a portable computer, a single electrode electroluminescent device is mounted, preferably near the keyboard, so a user may place a finger on the surface of the electroluminescent device. The current source and automatic gain control (AGC) are in electrical connection with the electroluminescent device while the image sensor is located behind and in the optical path of the electroluminescent device. The image generated by the electroluminescent device is converted by the sensor array to electrical signals and then processed by the computer's processor or an application specific integrated circuit (ASIC) to generate descriptive information that is unique to that fingerprint. The processor or ASIC determines whether the resulting set of fingerprint descriptive information corresponds to one of the sets stored within the computer for authorized users. If the descriptive information corresponds to one of those stored in the computer, the computer is activated. Otherwise, access to the computer is denied. Preferably, the relief object image generator is normally in a "sleep" mode when the computer is off. By touching the relief object image generator, power is applied to the computer and the authorization process commences. If authorization is verified, the computer is automatically initialized with a predetermined set of programs and connections. Likewise, the relief object generator may be used to obtain an image of a person's finger so it can be processed and the resulting fingerprint descriptive information transmitted to a remote site and used to authenticate a person from a remote system. For example, an image of a person's fingerprint may be obtained, processed and transmitted to a banking system for access to a person's financial account or to view real-time images of one's child at a daycare center that can be accessed over an open network such as the Internet. In both the remote authentication and local authentication applications, the security afforded by the use of the relief object image generators discussed above may be further enhanced by the employment of an encryption technique for the transmission of the descriptive information and/or the command signifying a successful match. This would help to prevent the intentional or unintentional subversion or corruption of that data.

While the relief object image generator discussed above may be mounted at any suitable location on a computer, preferably, it is mounted in a location convenient for user access. In most portable and desk-top computers, a cursor control device such as a mouse, joystick, direction keys or other variable position/direction indicating device, is placed in such a location. By sizing the relief object image generator so it approximates or is less than that of known cursor control devices, the relief object image generator may be more readily incorporated into computers of current design through the physical replacement of these cursor control devices. Of course, if the relief object image generator physically replaces the cursor control device and all previous functionality is to be retained, the relief object image generator must be capable of accomplishing all functions associated with the replaced cursor control device.

In the cursor control device of the present invention, an image generated by the single electrode electroluminescent device of a relief object image generator is detected by light sensing elements of a sensor array and provided to an image processor. In response to movement of an object or finger imaged by the relief object image generator, a number of the light sensing elements may transition from a light detecting state to a no light detected state or vice versa. The resulting change in the generated image is processed to determine a direction of movement of the relief object and to generate a corresponding directional control signal that causes the display screen pointer to move in a corresponding direction. For example, if a finger is rolled to the user's right, the left side of the image is no longer detected and the right side of the image increases. This causes the image processor to generate a right directional control signal that is used to move a displayed cursor to the right. In a similar manner, the cursor may be moved in other directions.

The "click" of known mouse devices for highlighting a displayed object may be implemented in the preferred embodiment of the present cursor control device by detecting the absence of a previously detected image and then timing the interval of image absence before the image reappears. If the image reappears before the interval exceeds a predetermined maximum interval length, a "click" operation is implemented. In a similar manner, a "double click" operation may also be implemented. Also in a similar manner, both the "click" and "double click" operations, as well as other special actions, may be initiated using other combinations of changes to the relief object images and may also be implemented to accomplish the "click and drag" functions of known cursor control devices.

Likewise, a computer control device of the present invention may use a relief object image generator having a pressure-variable impedance layer to generate control signals that implement the "click," "double-click" and "drag" functions, as well as other special functions or actions. In these implementations of a computer control device, a gradual increase in pressure caused by the relief object on the flexible conductive layer generates a corresponding increase in the current flowing through the flexible layer that intensifies the image. By sensing this changing intensity and determining when it crosses a predetermined threshold, the processor may detect an image change and generate a control signal to activate a special function such as a "click," "double-click," or "drag" function. Functions activated by multiple signals, such as a "double-click," may be implemented by detecting repetitive crossings of the image intensity across a single threshold or a series of crossings across multiple thresholds.

The computer control device of the present invention may also be used for operational parameter control. In a manner similar to that discussed above for the cursor control device, the processor may detect changes in the relief object image so a user may select or activate a computer peripheral or subsystem. In a similar manner, the processor may detect other changes to the relief object image as commands to select and adjust specific control parameters for the selected computer peripheral or subsystem. For example, a computer operational control device of the present invention may be mounted in the housing of a computer monitor. An image processor and memory of the control device processes images of a finger or other object produced by the relief object image generator. By employing the "click" and "double-click" implementations described above, the user may select a control parameter for the monitor, such as contrast or brightness. For example, rolling a finger on the relief object image generator may produce a changing image that may be processed by the image processor to generate a control signal that selects monitor brightness, for example. Continuing the example, rolling one's finger to the right may result in the image processor generating a control signal that increases the monitor brightness while processing a finger image rolling to the left may result in a control signal that decreases the monitor brightness.

These and other advantages and benefits of the present invention may be ascertained from the detailed description of the invention presented below and the drawings discussed therein.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

FIG. 1A depicts the electroluminescent device of FIG. 1 having a concave surface to facilitate placement of a rounded relief object;

FIG. 4 is an embodiment of the present invention using a reduction lens and sensor array to provide an electrical data representation of a relief object image;

FIG. 5 depicts an embodiment of the present invention with a sensor array which is approximately the size of the electroluminescent device for use in thin profile applications;

DETAILED DESCRIPTION OF THE INVENTION

Figure 1:
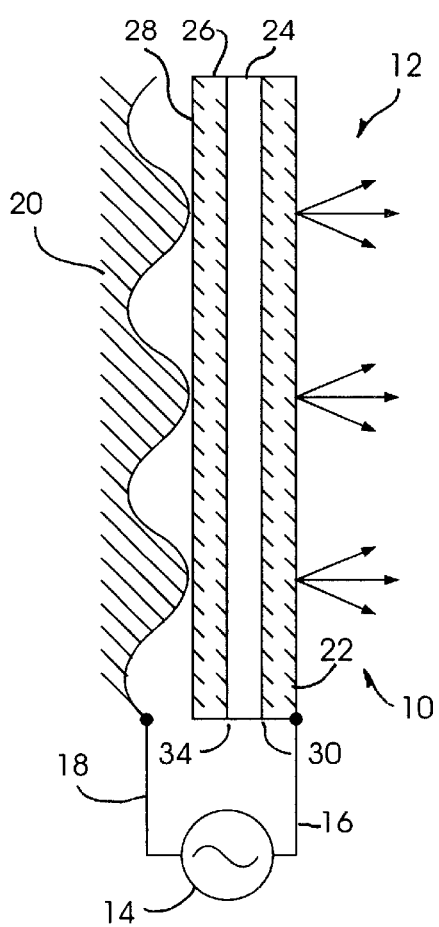
FIG. 1 depicts a relief object image generating system made in accordance with the principles of the present invention which uses an inorganic electroluminescent device.

A relief object image generator that may be used to accomplish a practical implementation of computer access control and user/computer interface control is shown in FIG. 1. Relief object image generator 10 includes a single electrode electroluminescent device 12 and an electrical current source 14. The electrical current source has a lead 16 which is coupled to electroluminescent device 12, and a second lead 18 for coupling current to a relief object when it is placed against or proximate to electroluminescent device 12. In response to the current coupled from the relief object to electroluminescent device 12, different areas of electroluminescent device 12 generate light at intensities which correspond to the amount of current coupled to an area of electroluminescent device 12. Electroluminescent device 12 may be constructed from known inorganic electroluminescent devices that typically include two planar electrodes which are mounted at opposite ends of the electroluminescent device so they cover the length and width of the device and are aligned with one another. This type of structure is used, for example, to provide a back-light for a liquid crystal display. By fabricating the electroluminescent device with only one electrode and coupling a current source to the relief object, the features of the relief object couple current differently to the electroluminescent device to selectively stimulate areas of the electroluminescent device and produce an image of the relief object. Electroluminescent device 12 is formed with a slightly concave surface (FIG. 1A) to facilitate placement of a rounded relief object, such as a fingertip, against device 12.

Electroluminescent device 12 may be an inorganic electroluminescent device or an organic electroluminescent device. Organic electroluminescent devices include thin sublimed molecular films such as tris(8-quinolinolato) aluminum (III) commonly known as Alq or light-emitting polymers having specialized structures which provide positive and negative charge carriers having high mobilities. The light-emitting polymers include poly (p-phenylene vinylene) or PPV, soluble polythiophene derivatives, and polyanilene which may be applied by known coating techniques such as spin or doctor-blade coating. Prototypes of these devices are manufactured and available from Uniax Corporation of Santa Barbara, Calif.

Electroluminescent device 12 in FIG. 1 is an inorganic electroluminescent device. Inorganic electroluminescent device 12 includes a transparent electrode 22, a light emitting layer 24, and a dielectric layer 26. Current source 16 is an alternating current (AC) source. Electrode 22, light emitting layer 24, and dielectric 26, are all preferably planar materials and are structured so that electrode layer 22 has a first surface 30 which lies along one surface of light emitting layer 24 and dielectric layer 26 has a first surface 34 which lies along the opposite planar surface of light emitting layer 24. Lead 22 from alternating current source 14 is coupled to transparent electrode 22 and lead 18 extends from alternating current source 14 to a relief object 20. One way to provide a second lead is to place a pad of insulating material (not shown) along one end of dielectric layer 26 that is exposed for contact with a relief object. The second lead may then be placed on top of the insulating layer so that a relief object brought in contact with the exposed area of dielectric layer 26 may also be coupled to alternating source 14. In this arrangement lead 18 may be fixed to the insulating pad located at one end of dielectric layer 26 so it is not easily moved to a position where alternating source 14 is short circuited.

Transparent electrode 22 is, preferably, a polymeric material coated with a transparent electrode composition such as indium tin oxide (ITO). Electrode 22 is transparent to permit light generated by light emitting layer 24 to pass through with little attenuation or modulation.

Light emitting layer 24 may be a coating of light emitting particles applied and adhered to the first surface of transparent electrode 22 utilizing a binding agent. The coating is preferably a phosphor material such as zinc sulfide:copper (ZnS:Cu) although materials such as zinc sulfide:manganese (ZnS:Mn) may be used as well. Alternatively, light emitting particles may be dispersed in dielectric layer 26. In this electroluminescent device, the light emitting layer is not a distinct layer interposed between the dielectric layer and transparent electrode but is suspended in the dielectric material, preferably in a uniform manner. For example, the phosphor material may be dispersed in an insulating dielectric material such as barium titanate ($BaTiO_3$). Furthermore, selection of the specific materials for the phosphor, as well as for other particles of the electroluminescent device, are partially based on the interaction of the particles with and their effect on the emitted light. Some materials have physical properties that are manifested in refractive or reflective optical characteristics that help concentrate emitted light in a hemispherical direction toward the sensor. Although the material disclosed for transparent electrode 22, light emitting layer 24, and dielectric layer 26 are exemplary, they are not the only materials that may be used. For example, transparent electrode 22 may also be made from zinc oxide-:aluminum (ZnO:Al) and other light emitting particles such as zinc silicate ($Zn_2SiO_4$) and zinc gallate ($ZnGa_2O_4$) may be used. The dielectric material may be from a variety of materials such as yttrium oxide, silicon nitride, or silicon oxy-nitride.

While the dielectric material may be translucent, it is, preferably, substantially opaque. This optical property blocks most of the ambient light that enters the dielectric layer. Because the dielectric layer conducts the current generated by the relief object so it stimulates the light emitting particles, an opaque dielectric layer permits the light sensed by the sensor array to be primarily the light generated by the relief object. The ambient light from the environment of the relief object is attenuated by an opaque dielectric layer and does not generate optical noise that may interfere with the generation of the relief object image.

Also, the capacitive effect provided by the dielectric layer between a relief object and the transparent electrode, is not required for some applications. For example, when the relief object to be imaged is a person's finger, dielectric layer 26 is not required in order to produce an acceptable image and the upper surface of light emitting layer 24 may be exposed.

The finger being imaged possesses sufficient electrical capacitance that the finger can be imaged by an inorganic single electrode electroluminescent device having a light emitting layer 24 with its upper surface exposed, a transparent electrode 22, and an alternating current source 14.

Alternating current source 14 may output a root-mean-square (RMS) voltage in the range of 20 to 300 volts having an output frequency in the range of approximately 50 Hz to 20 KHz. To adequately drive 6.5 square centimeters (about one square inch) of the light emitting layer disclosed above, a current in the range of 100 to 500 microamperes (RMS) is typically required. The light emitted by the phosphor and the materials disclosed above is within an emission spectra which is typically visible and often in the blue, blue-green, and green wavelengths. While the system is discussed with reference to radiation being emitted in the visible light portion of the radiation spectrum, other materials emitting radiation in other portions of an emission spectra may be used and remain within the principles of the present invention.

One way to construct system 10 is to modify the design of a known electroluminescent (EL) lamp. These devices are well known and an exemplary EL lamp is that manufactured by Durel Corporation of Chandler, Ariz. and designated as part number DB5-615B. EL lamp structure differs from the structure shown in FIG. 1 in that the exposed surface 38 of dielectric layer 26 is bonded to an opaque electrode, such as aluminum, silver, or carbon. When an alternating current source is coupled to an EL lamp, the current passed from the opaque electrode to the transparent electrode excites the light emitting particles causing them to generate light. However, such a structure is inoperative to image relief objects as the opaque electrode provides a steady state flow of current across its area. The inventors of the present invention have modified the EL device design by eliminating the opaque electrode and exposing dielectric layer 26. By providing the second lead from alternating source 14 at a insulated pad located at an end of dielectric layer 26, a relief object brought in contact with dielectric layer 26 may also be placed so it contacts lead 18. As a result, those portions of the relief object which directly contact dielectric layer 26 provide current at a magnitude different from the current provided at the portions of the relief object which are not in direct contact with dielectric layer 26. This modification of an EL lamp and the use of a modified EL lamp to image a relief object is disclosed in co-pending patent application Ser. No. 08/926,277 entitled Relief Object Image Generator.

The dielectric layer/light emitting particles/transparent electrode structure may be electrically modeled as a capacitor in parallel with a resistor. In the materials preferably used to construct the present invention, the capacitance of this structure is in the range of 2 to 6 nFarads per 6.5 square centimeters (about one square inch) and the resistance is in the range of 50 to 1,500 KΩ per 6.5 square centimeters (about one square inch). The amplitude of the output voltage of alternating current source 14 may be adjusted to alter the intensity of the emitted light which corresponds to the ridges of the relief object. Current sensing or current limiting circuits may be coupled to the second lead from alternating current source 14 to ensure the current provided to a relief object adheres to international regulatory limits for applications where the relief object is a portion of a person.

The light generated by the relief object image generator is governed by a complex relationship between the self-impedance of the relief object and the frequency dependent phosphor emission transfer function of the electroluminescent device. The relief object self-impedance may include capacitive, ion transport, and resistive components and has been shown to vary as the reciprocal of input voltage frequency and the inherent capacitive coupling between the electroluminescent device and the relief object. For example, in comparison with a shallow valley, a deep valley on the surface of the relief object is farther removed from the surface of the electroluminescent device and exhibits a smaller capacitive coupling with the electroluminescent device. Its capacitive impedance is therefore larger than that exhibited by a shallower valley which is closer to and more strongly coupled with the electroluminescent device. This characteristic allows areas of the relief object not proximate to the surface of the electroluminescent device to conduct AC current and to illuminate a portion of the electroluminescent device. The intensity of the illumination is proportional to the physical separation of the relief object and electroluminescent device at that point. As the voltage frequency is increased, the illumination intensity associated with a given separation decreases, but this change in illumination intensity is less for points closer to the electroluminescent device surface than for those further away. This phenomena results in an apparent increase in the optical contrast of the relief object image. The voltage amplitude may then be increased to compensate for the lower intensity of the image segments associated with the relief object ridges which are proximate the electroluminescent device. However, the optical transfer function of the phosphor is strongly related to frequency with the optical illumination from an electroluminescent device at a given voltage increasing rapidly with an increase in the voltage frequency. Thus, the self-impedance of the relief object and the transfer function of the electroluminescent layer compete. Consequently, the frequency and amplitude output of the current source may both be varied to optimize the intensity and contrast of a relief object image for a given relief object/electroluminescent device combination. Furthermore, evidence suggests that, associated with the frequency dependency, an additional interrelationship exists between image contrast and the waveform of alternating current source 14. This interrelationship is an extension of the convolution of the relief object self-impedance and phosphor optical transfer functions described above and relates to the manner in which the electrical energy is locally stored within the image plane of electroluminescent device 12 and subsequently translated into emitted light. Thus, relief object image intensity and contrast may be additionally optimized by varying the waveform of the signal output by current source 14.

Figure 2:
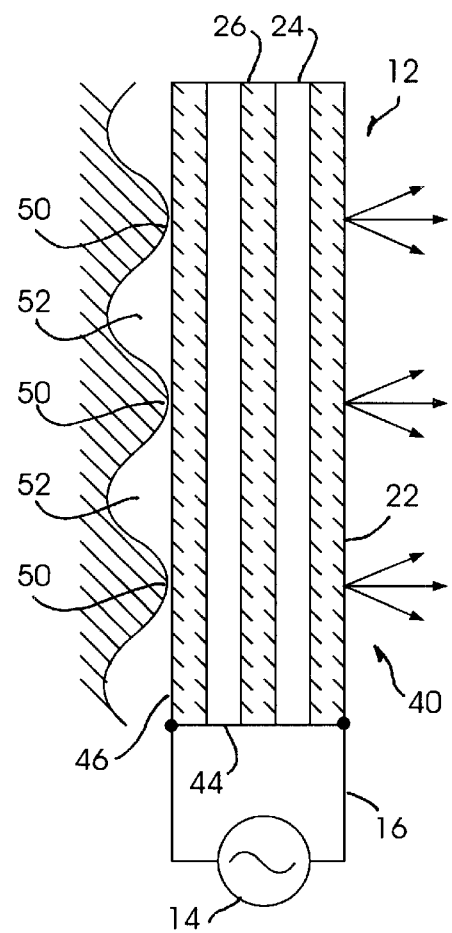
FIG. 2 depicts an embodiment of the present invention that insulates the relief object from the current of the alternating current source in FIG. 1.

A system that includes an electroluminescent device which may be used without a current limiting or sensing circuit is shown in FIG. 2. Using like numerals for like structure, system 40 includes transparent electrode 22, light emitting layer 24, and dielectric layer 26. The various materials and structure discussed above with the embodiment of FIG. 1 are likewise applicable for the embodiment shown in FIG. 2. In addition to these elements, system 40 includes a variable impedance layer 44 and a flexible electrode 46 to which the second lead from alternating current source 14 is coupled. The first lead 16 from alternating source 14 is coupled to transparent electrode 22 as discussed above.

Variable impedance layer 44 is comprised of a non-conducting, compressible polymeric material in which conductive and/or capacitive particles are suffused. The conductive/capacitive particles are distributed throughout the polymeric material and are separated from one another by a distance which is slightly larger than the diameters of the particles. The conductive/capacitive particles may be low density polymeric or ceramic spheres coated with a metallic layer. Magnetic particles may also be added to the composition of the variable impedance layer to improve electrical conductivity. By varying the number of conductive/capacitive particles per unit volume, the size of the particles, the conductive/capacitive properties of the particles, the bulk material modulus of the polymeric material, and other known factors, the impedance of a conductive path from one surface of variable resistance layer 44 to the opposite surface as a function of pressure applied to the first surface may be designed to vary over a wide range. Where the particle sizes are small and the thickness of the polymeric material is thin, high spatial resolution of localized pressure is possible. Preferably, the diameters of the conductive/capacitive particles and non-conductive metric polymers should be smaller than the smallest resolution element desired for the image. The thickness of variable impedance layer 44 should approximate the same resolution element size. Preferably, the thickness of the variable resistance layer is in the range of 50–100 micrometers. Variable impedance layers which may be used in the device shown in FIG. 2 are disclosed in U.S. Pat. Nos. 5,209,967 and 4,624,798. Preferably, flexible electrode 46 is made of a thin polymer such as polypropylene or polyester that is less than 25 micrometers in thickness and having a very thin sputtered metallic coating.

When a relief object 20 is brought in contact with flexible electrode 46, those portions of the relief object which directly contact flexible electrode 46, i.e., ridges 50, locally compress impedance layer 44 to form a conductive path to dielectric layer 26. This conductive path allows current to move from flexible electrode 46 through impedance layer 44, dielectric layer 26 and light emitting layer 24 to transparent electrode 22. This current flow excites the light emitting particles in the flow path so the particles emit light at an intensity that corresponds to the magnitude of the current. As the pressure in the areas adjacent valleys 52 of relief object 20 do not compress those areas of impedance layer 44 as tightly as those areas adjacent ridges 50, the conductive paths in the areas adjacent valleys 52 have electrical impedance that is greater than those areas adjacent ridges 50. Consequently, the light emitting particles aligned with the relatively uncompressed areas of impedance layer 44 emit light having an intensity that is less than that generated by the more tightly compressed areas. Accordingly, an optical image of the relief object is generated where light is more intense at the areas corresponding to the ridges of the relief object and less intense at the areas where there are valleys in the relief object.

Flexible electrode 46 and impedance layer 44 provide a pressure-to-optical conversion of the relief features of the relief object. As a result, the light absorbing and reflective properties of the relief object do not affect the image generated by the device shown in FIG. 2. Furthermore, flexible electrode 46 isolates the relief object from the current output by alternating current source 14. As the electrical coupling mechanism from the relief object to electrode 46 and impedance layer at 44 to dielectric layer 26 is primarily impedance, altering the amplitude of the output voltage still adjusts the intensity of the light emitted from the light emitting particles receiving current from flexible electrode 46.

Figure 3:
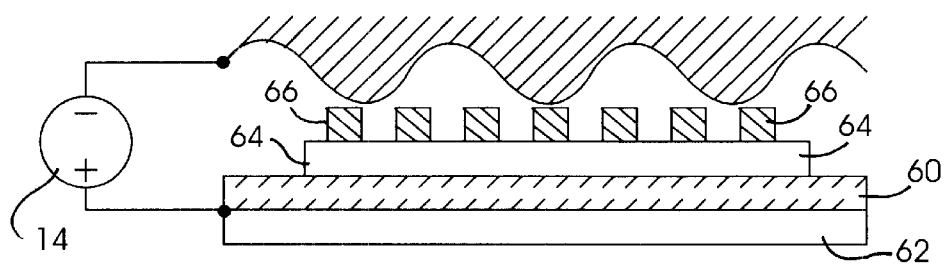
FIG. 3 depicts an embodiment of the present invention in which an organic electroluminescent device is used.

A system having a relief object image generator which utilizes an organic electroluminescent device is shown in FIG. 3. The electroluminescent device 60 includes an anode 62, an organic layer 64, and a pixelated, low work function metalization layer 66. Preferably, anode 62 is transparent and may be formed by coating a base substrate of glass or plastic with indium tin oxide (ITO). Organic layer 64 is formed by depositing a thin film layer such as polyaniline over the ITO and then an electroluminescent polymer such as poly(2-methoxy-5-(2'-ethylhexyloyx)-1,4-phenylene vinylene), also commonly known as MEH-PEV, is deposited over the polyanilene. A metal, such as calcium or aluminum, is deposited over organic layer 64 to form pixelated, low work function metalization layer 66. Preferably, current source 14 is a direct current (DC) source which outputs a voltage of approximately 10 V at approximately 40 milliamperes.

If the relief object to be imaged is capable of absorbing relatively high voltage drops at current levels of a few milliamperes, then the relief object may be brought in contact with a lead from current source 64 and placed against electroluminescent device 60 for imaging. To further reduce the current magnitude brought in contact with a relief object, a pressure-variable impedance layer is interposed between the relief object and the organic layer. The pressure from the ridges of the relief object generate a lower impedance path through the impedance layer than the pressure from the valleys of the relief object. The current from the current source is then coupled at different magnitudes to the electroluminescent device. The number of holes and electrons generated by an area of the electroluminescent layer is proportional to the magnitude of current coupled to the area. The recombination of these holes and electrons generates photons with the intensity of the resulting light being dependent upon the number of holes and electrons generated in an area. Use of a pixelated low work function metallic layer, such as aluminum or calcium, defines discrete areas for coupling current from a impedance layer to anode 62. The variable impedance layer electrically isolates the relief object from the current source to reduce the current magnitude to which a relief object may be exposed.

As shown in FIG. 4, system 10 is aligned with a reduction lens 70 and an integrated circuit sensor array 72. Reduction lens 70 and integrated circuit sensor array 72 are well known in the art and are typically used with the relief object image generators that require a separate, indirect light source. The system of the present invention reduces the size of the generated image so the sensor array may be a smaller, and hence, a more economical size. Still, this system requires the distance from the relief object to the sensor array 72 to be several times the focal length of the reduction lens 70. While the system of FIG. 4 depicts the use of a reduction lens to transfer the image generated by an electroluminescent device to a sensor array other known optical elements may be used for the image transfer including, but not limited to, reduction lens systems of other configurations (e.g., doublets, triplets, cylindrical, etc.), curved reflective optics, fiber optic bundles, or combinations of any or all of the above.

In applications where a thin profile is required, such as cellular phones, portable computers and the like, reduction lens 70 may be eliminated and a sensor array 78 placed along the exposed surface of transparent electrode 22 as shown in FIG. 5. Sensor array 78 is typically not of the conventional integrated circuit type to reduce cost. Instead, sensor array 78 may utilize low cost processes such as those developed in the flat panel display industry involving the application of semiconductor material onto an insulating substrate. Such exemplary processes include amorphous silicon on glass and low temperature polysilicon on glass or plastic film. The signals from these sensor arrays may then be provided to a computer, either embedded or external, for further image processing.

In operation, an electroluminescent device having a single, transparent electrode is coupled to a current source so that one lead from the current source is coupled to the transparent electrode and a second lead from the current source is left exposed near an exposed surface of the electroluminescent device in such a manner as to essentially require contact by a relief object proximate the exposed surface of the electroluminescent device. Preferably, the second lead is fixed to an insulator mounted at one end of the exposed surface of the electroluminescent device and physically separated from that exposed surface by a distance greater than the maximum ridge to valley distance for the relief object. A relief object is brought into contact with the exposed surface of the electroluminescent device and also coupled to the second lead of the current source. The current through the relief object is coupled, either strongly at the ridge contacts or weakly at the valleys, to the electroluminescent device. Those light emitting particles aligned with the ridges of the relief object cause the electroluminescent device to generate light at an intensity greater than those light emitting particles aligned with the valleys of the relief object. The difference in the intensity in the light generated by these particles forms an optical image of the relief object.

An alternative relief object image generator includes a variable impedance layer that covers the exposed surface of the electroluminescent device and a flexible electrode that is provided over one surface of the variable impedance layer. The first lead of the current source is coupled to the transparent electrode and the second lead is coupled to the flexible electrode. When a relief object is pressed against the flexible electrode, localized pressure corresponding to the ridges of the relief object compresses a portion of the impedance layer to form a conductive path having less electrical resistance than the portions of the impedance layer proximate the valleys of the relief object. As a result, currents through the conductive paths corresponding to the ridges have magnitudes that are greater than those through the conductive paths corresponding to the valleys. The higher magnitude currents coupled to the electroluminescent device generate light at an intensity greater than those portions of the electroluminescent device coupled to the currents corresponding to the valleys. The light generated by the electroluminescent device forms an optical image of the relief object where light areas correspond to the ridges of the relief object and darker areas correspond to the valleys of the relief object. The optical images of both embodiments may be focused by a reduction lens and sensed by an integrated circuit sensor array or provided to a one-to-one sensor array for conversion to electrical signals.

Figure 6:
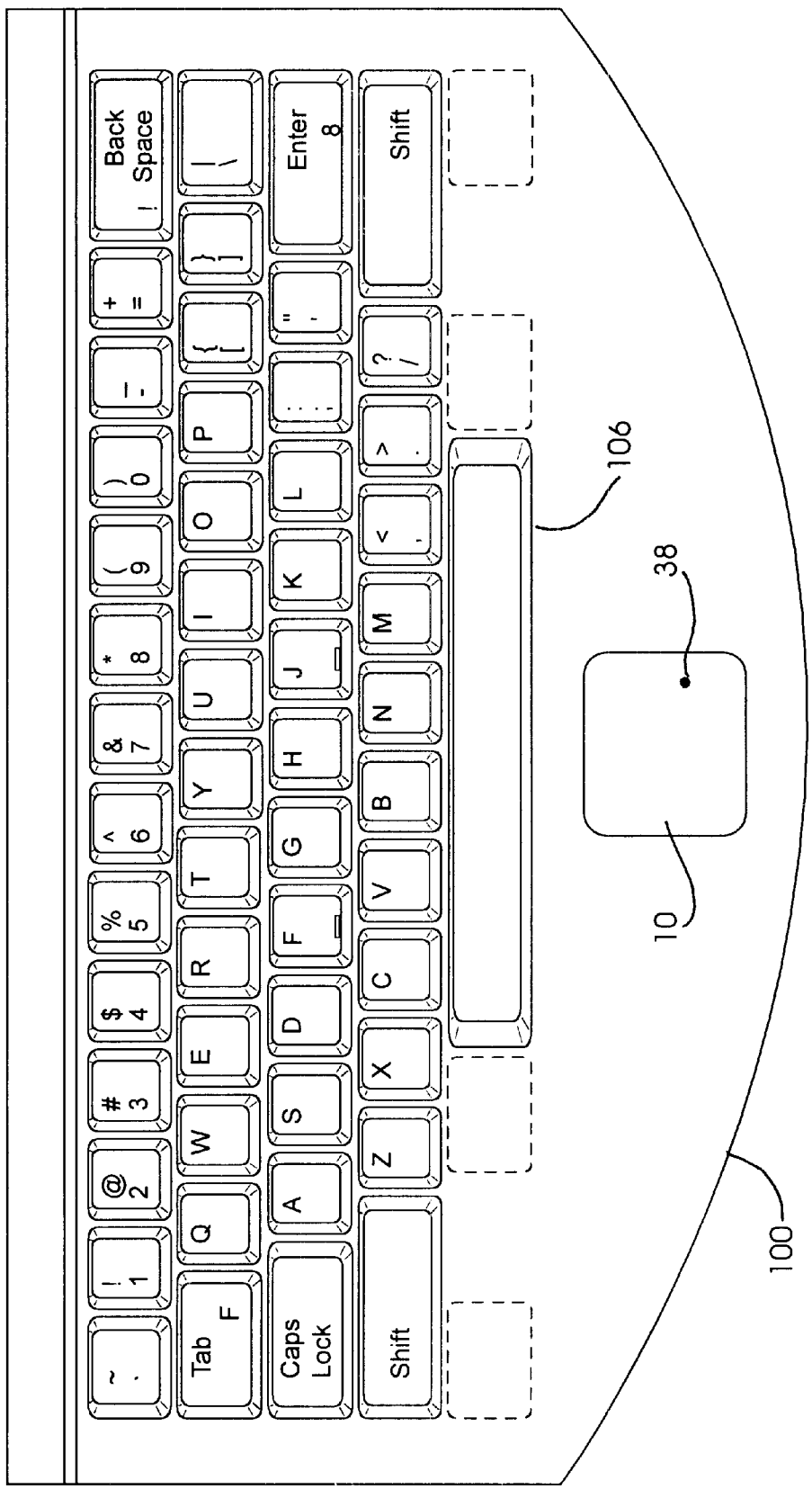
FIG. 6 is a top plan view of a keyboard of a portable computer showing a location for a fingerprint imaging system of the present invention.

System 10 of FIG. 5 may be mounted in a keyboard of a computer as shown in FIG. 6. Keyboard 100 is a typical QWERTY keyboard having function keys 104 and system 10, like the one shown in FIG. 5, is mounted under space bar 106 so a user can place a finger against exposed surface 38 of dielectric layer 26. Although the relief object image generator of FIG. 6 is described with particular reference to system 10 of FIG. 5, the reader should appreciate that relief object image generator 10 may include an organic or inorganic single electrode electroluminescent device and the inorganic electroluminescent device may include or not include a dielectric layer 26. An image processor and memory (not shown) are coupled to sensor array 78 to receive and process an image of a user's fingerprint. Preferably, the image processor applies an image compression or minutia extraction algorithm to the electrical signals generated by sensor array 78 to produce unique fingerprint descriptive information corresponding to the optical image. The descriptive information may then be stored or used for further processing or transmitted to a remote location. The image processor and memory may be the processor and memory for the computer. Alternatively, the processor and memory may be implemented in an application specific integrated circuit (ASIC). The program or firmware that controls the operation of the processor may be controlled by the operating system for the computer if the computer processor and memory is utilized or may be stored in a non-volatile memory within the ASIC. For access control, the image processor compares a received image or descriptive information of a fingerprint to fingerprint images or descriptive information for authorized users stored in fixed or portable memory. In this application, fixed memory applies to the memory physically resident within the relief object image generator or the computer to which the image generator is coupled. Portable memory is any information storage media or device which is not physically resident with the relief object image generator but is typically controlled by the user. This includes, but is not limited to, printed data in the form of symbology, optical laser cards, smart chip cards, passive and active RF cards and magnetic stripe cards. The image processor includes a reader for one or more forms of portable memories if authorization data stored a portable memory is used for generation of an access granted signal. Such readers are well known within the art. If the image or descriptive information for a user's fingerprint matches the image or descriptive information for an authorized user, the image processor generates an access granted signal that may be used to activate the computer for the user. As shown in FIG. 6, system 10 is preferably mounted where a cursor control device, such as a mouse, is typically located. However, alternative locations may be used, such as in the upper right corner or in place of the arrow keys, or system 10 may be mounted within a housing and coupled to a computer through an electrical cable or the like.

System 10 of the present invention may be coupled to or integrated into a computer system such that the alternating current source of a relief object image generator has an electrical potential maintained across the electroluminescent material and the sensor array and image processor are powered, even when the computer system is in the "off" state. Alternatively, sensing circuitry may be coupled to the alternating current source to detect current being pulled through the electroluminescent device in response to an individual touching the electroluminescent material. The sensing circuitry of the alternative embodiment may be coupled to a power switch, such as a relay or varistor, that is activated in response to current being detected and the activated power switch applies electrical power to the sensor array and image processor for operation of the access control function. In response to the image processor determining that image data it generates corresponds to stored image data, an access granted signal is generated that may be coupled to another power switch. This power switch applies power to the remainder of the computer system. This embodiment maintains power to the access control device and activates a power switch to apply power to the computer in response to the access control device generating an access granted signal. The alternative embodiment includes sensing circuitry that detects current being pulled from the alternating current source and a first power switch is activated to apply power to the sensor array, memory, and image processor of the access control device. If the access control device generates an access granted signal then a second power switch is activated and power is applied to the computer. The access granted signal may be a binary signal or it may include information regarding the correspondence between the generated image data and the stored image data. For example, the generated image data may identify a particular authorized user having image data stored in the memory of the access control device. The access granted signal may contain identification of the authorized user and this signal may be provided to an initialization module, such as an initialization command file or hardware initialization controller such as a BIOS circuit, for computer initialization. In response, the initialization module selects predetermined configuration data that corresponds to the user identified in the access granted signal. This configuration data may activate the operating system resident on the computer system, configure peripheral settings to initial values associated with the identified user, log the user onto a LAN or the Internet, and/or start programs or applications authorized for the identified user. Additionally, the access granted signal may be provided to a computer coupled to the access control device through a LAN, WAN or other known type of communication link. Likewise, the configuration data may be used in a computer connected to the access control device or it may be provided to a computer coupled to the access control device through a LAN, WAN or other known type of communication link.

After a user has been verified for computer access, the image processor may be used for providing descriptive information generated from an image of a person's finger or other relief object to a remote site. For example, a person may place a finger on relief object image generator 10 so the image processor receives descriptive information from an image of the finger from sensor array 78. The image processor may then provide that descriptive information as a data file for transmission to a remote site, such as a bank processing center, to authenticate the user's authorization to access a financial account. Transmission of the relief object image or corresponding descriptive information may also be used to access other information such as realtime images of one's child at a daycare center over an open network such as the Internet. Thus, persons not having a child at the day care center would be less likely to gain access to the images of children's activities for improper purposes.

Figure 7B:
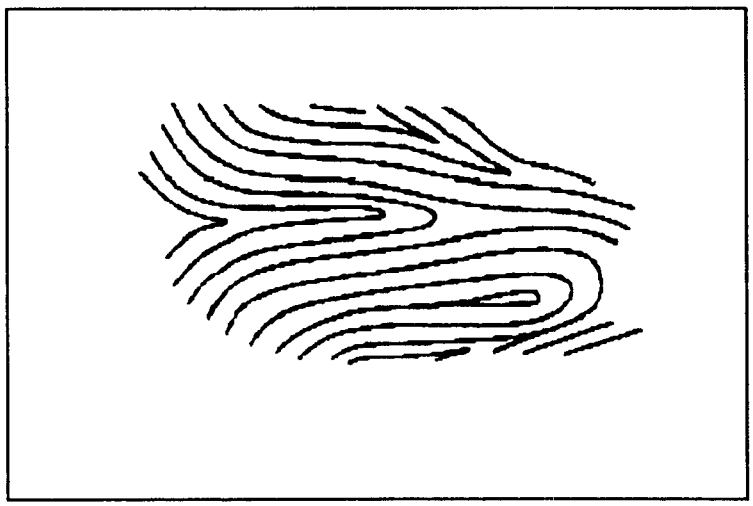
FIG. 7B is a depiction of a change in the image of the fingerprint shown in FIG. 7A that is processed to generate a directional control signal.
Figure 7A:
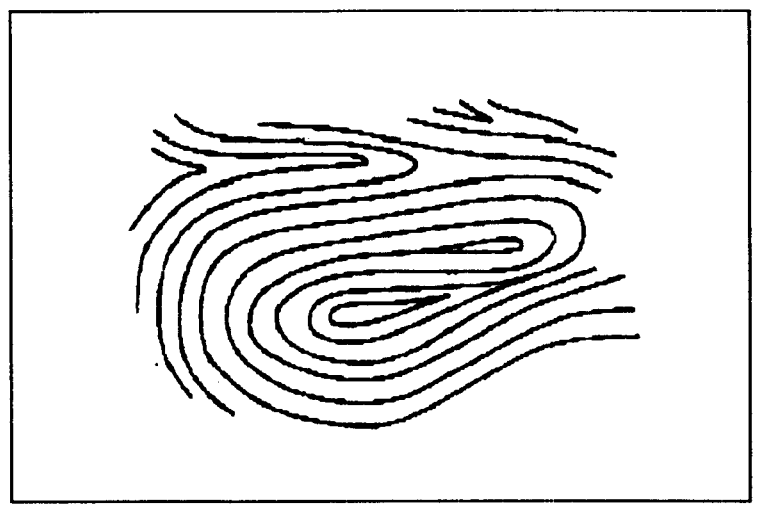
FIG. 7A is a depiction of a fingerprint sensed by the sensor array shown in FIG. 5.

System 10 may be used to provide cursor control signals as well as access control. The generation of cursor control signals is preferably performed in accordance with the movement of a user's finger on surface 38. Thus, embodiments of the present invention that include cursor control functions may also use relief object image generators that use other mechanisms for image generation other than electroluminescent devices. For example, U.S. Pat. No. 5,325,442 discloses a relief object image generator that uses capacitive sensing to generate a relief object image. In addition, the other known optical technologies earlier described may also be used for this type of application, as could other imaging devices that may meet the geometrical constraints for such applications. Such image generators are within the principles of the present invention for cursor control functions such as those discussed in more detail below. As shown in FIGS. 7A and 7B, movement may be detected by evaluating the image of a fingerprint. For example, the fingerprint in FIG. 7A is a fairly full image of a fingerprint generated by a relief object image generator while the image of FIG. 7B resembles that of FIG. 7A except the left portion of the image is absent and additional features are present on the right side. This image differential indicates that the user's finger has been moved to the left. Detection of this movement may be used to move a displayed cursor to the left.

Figure 8:
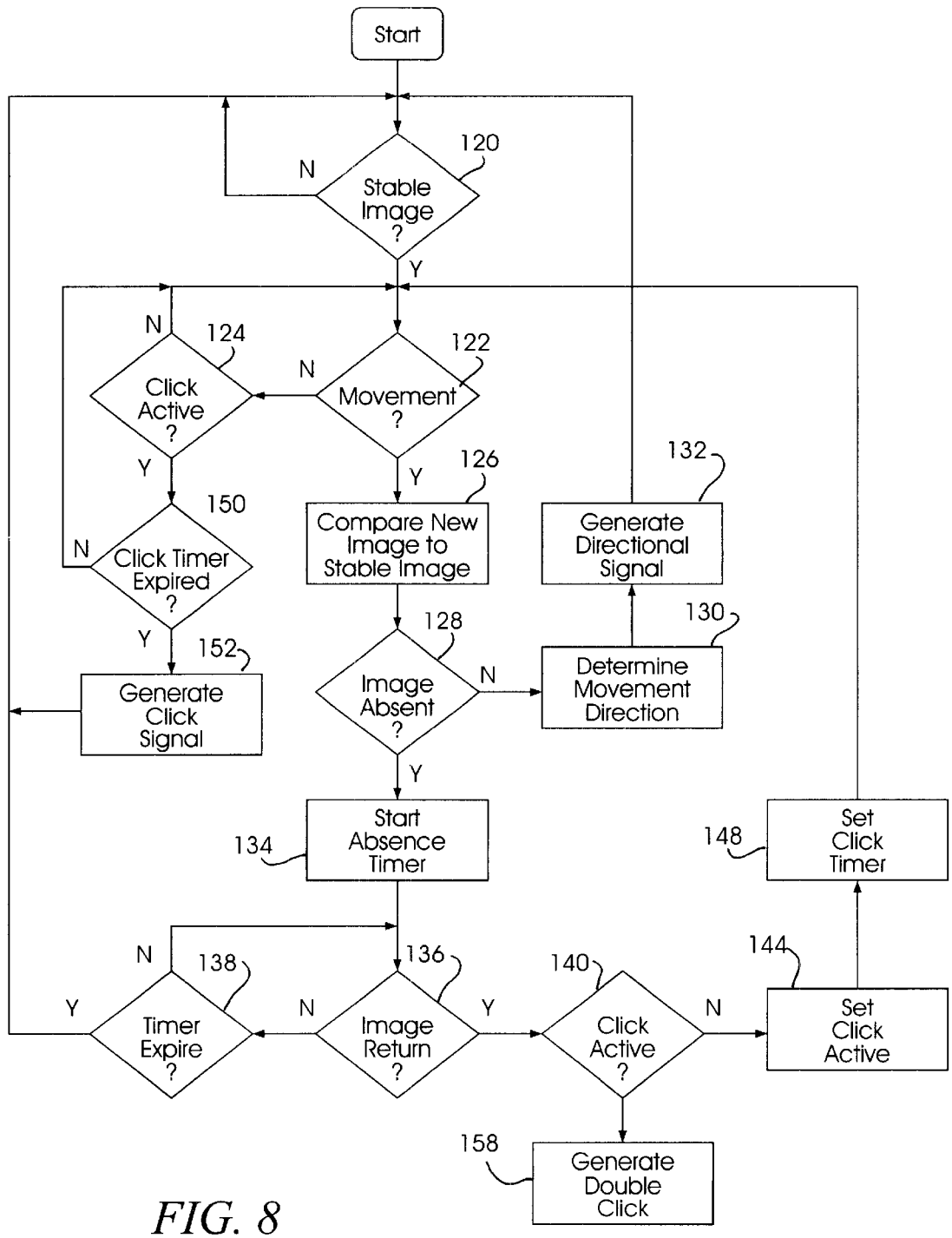
FIG. 8 is flowchart of exemplary processing performed on images to generate directional control signals and function select control signals.

An exemplary process for an image processor implementing a method for providing cursor control using a relief object generator is shown in FIG. 8. That process is preferably performed after the system processes an initial image of a person's fingerprint to determine whether the user can access the computer system. The process begins by determining whether an image of a person's fingerprint remains stable (step 120). Stabilization may be determined by (1) calculating a ratio of the number of changing sensor elements for the image over a predetermined period of time to the total number of sensor elements for the image and (2) comparing the ratio to a predetermined threshold that indicates a stable image. Other measurements may be used to evaluate the amount of image change such as the calculation of a L1 or L2 distance between two images taken at different times. Once the process determines the image is stable, it determines when movement occurs (block 122). Movement may be detected by one of the methods discussed for stabilization evaluation. If no movement is detected, the process determines if a "click" is active (block 124) and if it is not, the process continues to look for movement. Processing during an active "click" is discussed below. If movement is detected, the new image is compared to the stored stable image (block 126). If the image is not substantially absent (block 128), the process continues by determining the direction of the movement (block 130) and generating a corresponding directional control signal (block 132). The directional control signal conforms to directional control signals generated by a known mouse or other cursor control devices.

If the image of the finger is substantially absent, i.e., a substantial portion of the sensor elements detecting light for the image no longer detect light, an absence timer is initiated (block 134) and the process determines whether an image reappears (block 136) before the absence timer expires (block 138). If the image reappears before the timer expires, the process checks to see if a "click" status is active (block 140). If it is not, the "click" status is activated (block 144) and a "click" timer is activated (block 148). The process then continues to look for movement in the new image (block 122). If no movement is detected, the process determines whether the "click" timer has expired (block 150) and if it does expire before further movement is detected, a highlight control signal is generated (block 152). If new movement is detected, it either is processed to generate a directional control signal or a select function control signal. A select function is determined by detecting another absent image (block 128), determining whether the image reappears before the absence timer expires (blocks 136,138), and, if it does, determining whether the "click" status is active (block 140). If it is, the user has double tapped surface 38 and is indicating a "double click." In that event, a select function control signal is generated (block 158) to activate a function or the like.

In addition to the "click" and "double-click" special functions and their implementation described above, several other special functions may be commanded using a system of the present invention. These functions include the selection of any or all function keys for a computer system, dragging, highlighting, underlining, left-click/right-click, triple-clicking and other program specific functions. Some relief object image changes which may be processed to generate the function signals for these functions include finger rotation, subsequent application of the same finger in different orientations, swipe (specific direction including up, down, diagonal, or the like), swipe (specific pattern including tick, cross, circle, or the like), reversing swipes (including up/down, left/right, clockwise/counterclockwise, vice versa, or the like), two specific fingers simultaneously and two different fingers sequentially. These features may be controlled by the processor either as a function of changes in the spatial characteristics of the image or the intensity of the image.

Detecting intensity changes to generate control signals is especially appropriate for control devices having a pressure-variable impedance coating where an operator triggers desired signals based on the amount of pressure applied to the surface of the electroluminescent device. In these implementations, a gradual increase in pressure caused by the relief object on the flexible impedance layer generates a corresponding increase in the current flowing through the impedance layer that intensifies the image. By sensing this intensity and determining when it crosses a predetermined threshold, the processor detects an image change and generates a control signal to activate a special function such as a "click," "double-click," or "drag" function. Functions activated by multiple signals, such as a "double-click," may be implemented by detecting repetitive crossings of the image intensity across a single threshold or a series of crossings across multiple thresholds.

A system comprised of a relief object image generator, sensor array 78 (or one of the other sensor arrays discussed above), the image processor, and memory may be used to control operational parameters for a device. Again, the relief object image generator in such a system may be an electroluminescent device or other known relief object image generators that use capacitive sensing, alternative optical imaging or the like for image generation. In a manner similar to that discussed above for the cursor control device, the image processor may detect changes in the relief object image and generate control signals so a user may select an operational parameter for the device or activate a component of the device. For example, the parameter control device of the present invention may be incorporated in an automobile or an appliance. By placing a finger on the relief object image generator and moving the finger, the user causes the relief object image generator to generate an image of the finger that the image processor detects and processes. As the image of the finger changes, the image processor generates control signals that are used to select device functions, control the operation of the selected device function, or activate a device component. For example, such a system may be used to select the windshield wiper function of a car and control the wiper speed. Additionally, such a system may be used to control access to a device and then activate an initialization module for initializing the device to predetermined parameters in a manner similar to that discussed above for computer initialization following an access control determination. The access granted signal generated by the access control/operational parameter control device may contain identification of the authorized user and this signal may be provided to an initialization module, such as an initialization command file or hardware initialization controller such as a BIOS circuit, or an initialization module that includes a memory for the storage of parameter values and control signal generators for sending control signals corresponding to the initialization values to components of the device. In response, the initialization module selects parameter values as defined by predetermined configuration data that corresponds to the user identified in the access granted signal when the access granted signal contains user identifying data. This type of access control device may be used to initialize device components such as seat position and radio settings for a car, for example, once the access granted signal has been generated by the image processor. For systems where the access control device is remotely located from the device, the access granted signal generated by the image processor may be transmitted to the device through a communication link which may be wired or wireless.

In a computer system, the operational control device may be used to select or activate a computer peripheral or subsystem. Again, the image processor may detect changes to the relief object image as commands and generate control signals to select and adjust specific control parameters for a selected computer peripheral or subsystem. For example, such a system may be mounted within the housing of a computer monitor for tilt, pin-cushion, horizontal width and position, vertical height and position, brightness and contrast control. In response to a highlight control signal being generated in response to the system detecting a "click" operation, a menu of operational parameters may be displayed. Generation of up and down directional control signals in response to the corresponding movement of the finger's image, causes the menu to alternately move the highlight to one of the operational parameters. If the user moves the finger to the left or right, the corresponding right or left directional control signal may be used to increase or decrease, respectively, the highlighted operational parameter. This description of an operational parameter control device is exemplary only and the reader should appreciate that other types of parameters and greater numbers of operational parameters for a number of devices may be controlled by a system having a relief object image generator, a sensor array, an image processor, and a memory with a program or firmware that generates highlight, select, special function activation, directional, cursor control or other control signals or the like.

Another embodiment of the present invention is comprised of a single electrode electroluminescent device proximate a sensor array that is used to receive data from a writing stylus. This embodiment builds upon the computer access, cursor control and computer parameter control features described above in two ways. First, a conductive stylus is coupled to the current source and used as a specific type of relief object. As a point of the stylus contacts and moves against a flexible electrode overlaying an electroluminescent device, an image is generated. The image is received by the sensor array, converted to electrical signals and then the image or descriptive information about the image is stored. The image formed by movement of the stylus point may be determined by an image processor generating a composite image of the stylus point trajectory from a series of images of the stylus point stored in memory. This composite image may then be evaluated to recognize alphanumeric characters or other symbology from a known set of symbols. In a similar embodiment using the single electrode electroluminescent device incorporating a pressure-sensitive membrane that overlays a surface of the electroluminescent device as described earlier, the pressure of the stylus creates a corresponding image which is, again, detected by the sensor and processed by the image processor. In both of these embodiments, the access control/operational parameter control device of the present invention also implements an electronic writing tablet or notepad.

Figure 9:
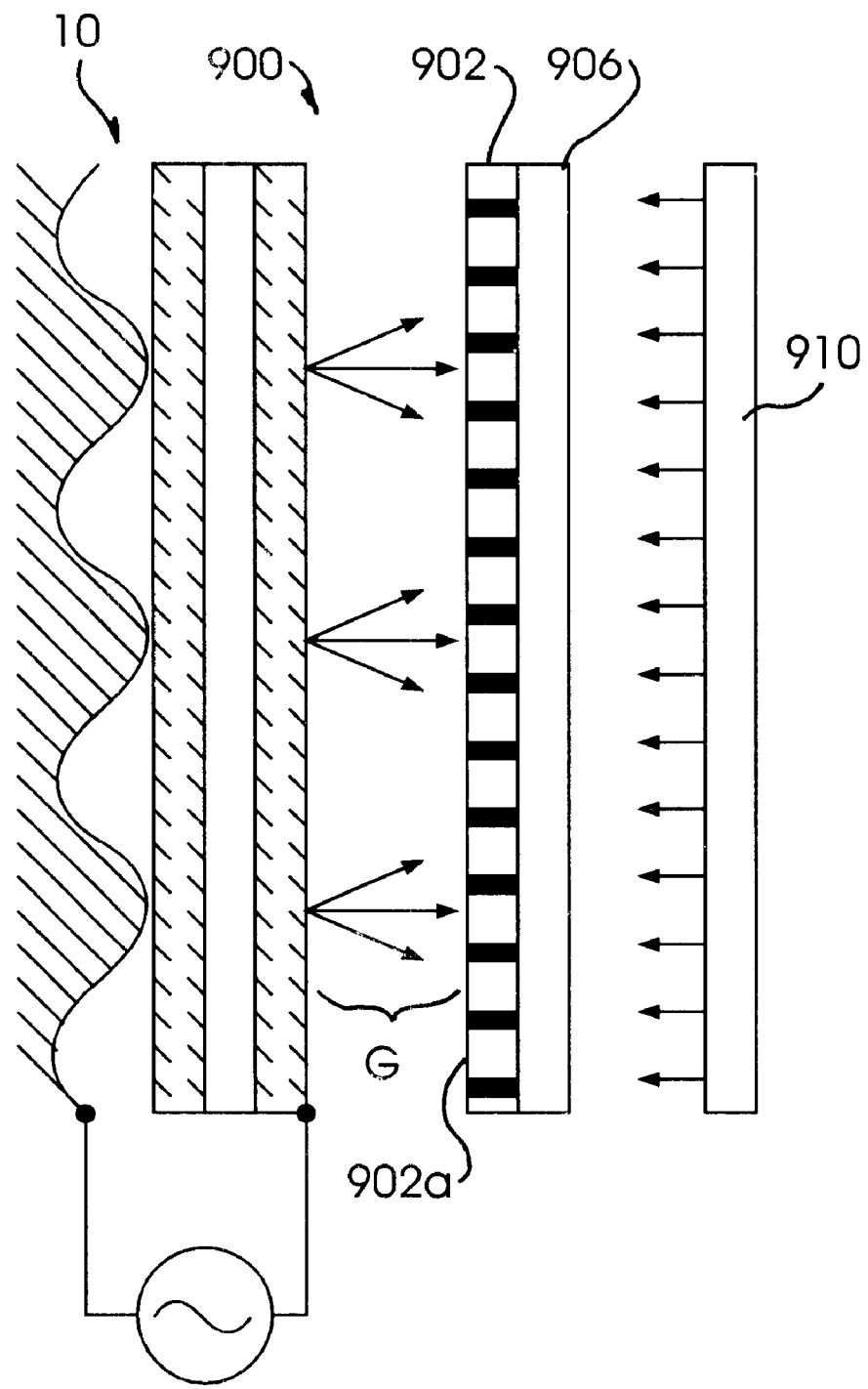
FIG. 9 is a depiction of an alternative embodiment of the computer access control/parameter control device of the present invention integrated with a document reader.

In yet another embodiment of the present invention, the computer access control/parameter control device discussed above may be integrated with a document reader. An exemplary embodiment of an integrated control device/document reader 900 is shown in FIG. 9. The device includes an electroluminescent device 10, sensor array 902, transparent substrate 906, and an external light source 910. Electroluminescent device 10 may be fixedly separated or spaced apart from sensor array 902 by a gap G to form a slot in which a document may be placed between electroluminescent device 10 and sensor array 902 for imaging. For example, reader 900 may be located near an edge of a computer housing (like device 38 in FIG. 6) so gap G is exposed at the edge of a computer housing to provide an opening for a business card or similar sized document between sensor array 902 and electroluminescent device 10. Alternatively, electroluminescent device 10 may be pivotally or slideably mounted to the housing of a computer so that device 10 may be moved to exposed an upper surface 902a of sensor array 902. In another alternative embodiment, one of electroluminescent device 10 and sensor array 902 is coupled to a biasing member and the other component is fixedly mounted or both components are coupled to one or separate biasing members so that electroluminescent device 10 and sensor array 902 are urged together. However, placing the edge of a document at the interface of sensor array 902 and electroluminescent device 10 displaces the biased component or components as a document is pushed between the two components. Removal of the document or other object to be imaged causes the two components to be urged together by the biasing member or members.

Transparent substrate 906 and external light source 910 are known components. Sensor array 902 is a sensor array like the one described in U.S. Pat. No. 5,349,174. This type of sensor array has a plurality of elements arranged in a matrix on a transparent substrate. These elements are spaced apart from one another and do not occupy all of the surface area of the sensor such that the sensor array is partially-transparent. The partially-transparent sensor array permits light source 910 to be located behind sensor array 902/ transparent substrate 906 and still illuminate an object placed on or near upper surface 902a of sensor array 902. Because a sensor array like the one described in the '174 Patent permits external light source 910 and transparent substrate 906 to be located so they do not interfere with the operation of the control devices using an electroluminescent device like the ones described above, sensor array 902, transparent substrate 906, and external light source 910 may be used to image objects placed against or near sensor array 902 without significantly impacting the geometric dimensions of the control device. After an object to be imaged, like a business card, is placed against surface 902a of sensor array 902 to support the document for imaging, a function key may be depressed to activate light source 910 and illuminate the surface of the object through transparent substrate 906 and sensor array 902. Light reflected by the document is received by sensor array 906 and converted to electrical signals that are processed by an image processor. Such a device may be used to image and store business card images or to image documents and generate descriptive data, or extract image data for storage in a database.

While the present invention has been illustrated by the description of several embodiments and while the embodiments have been described in considerable detail, the applicant does not intend to restrict or in anyway limit the scope of the appended claims to such detail. Additional advantages and modifications will readily appear to those skilled in the art. The invention's broader aspects are therefore not limited to the specific details, representative apparatus and method, or illustrative examples shown and described. Accordingly, departures may be made from such details without departing from the spirit or scope of applicant's general inventive concepts.

What is claimed is:

1. A device for controlling computer access comprising:
   a relief object image generator comprised of a single electrode electroluminescent device and an alternating electrical current source, said relief object image generator for generating an image of a relief object placed against said relief object image generator;
   a pressure-variable impedance coating over said relief object image generator, said pressure-variable impedance coating for insulating said relief object from said alternating current source and for generating increases in current to said relief object image generator in correspondence with pressure applied by said relief object to said pressure-variable coating;
   a sensor array for receiving said image and converting said image to electrical signals corresponding to said received image;
   a memory for storing image data corresponding to a relief object associated with an authorized user; and
   an image processor for generating image data corresponding to said electrical signals generated by said sensor array and for comparing said image data stored in said memory to said generated image data, said image processor generating an access granted signal in response to said stored image data corresponding to said generated image-data.

2. The device of claim 1 further comprising:
   optical elements interposed between said relief object generator and said sensor array for transfer of said image generated by said relief object image generator to said sensor array.

3. The device of claim 1 wherein said alternating current source of said relief object image generator remains in an active state while a computer coupled to said relief object image generator is in an "off" state; and
   said image processor generates said access granted signal in response to said generated image data corresponding to said stored image data while said computer coupled to said relief object image generator remains in said "off" state.

4. The device of claim 3 further comprising:
   a power switch for applying power to said computer in response to said access granted signal.

5. The device of claim 4 further comprising:
   a computer initialization module for selecting predetermined configuration data corresponding to said generated image data in response to said power switch applying power to said computer.

6. The device of claim 1 wherein said access granted signal is communicated to said computer coupled to said access control device through a communication link.

7. The device of claim 5 wherein said predetermined configuration data are communicated to said computer coupled to said access control device through a communication link.

8. The device of claim 1 wherein said image processor controls computer functions in correspondence with changes in said relief object image generated by said relief object image generator.

9. The device of claim 1 wherein
   said image processor controlling computer functions in correspondence with changes in said relief object image generated by said relief object image generator.

10. The device of claim 8 wherein said image processor controls said computer functions in correspondence with changes in at least two relief object images generated by said relief object image generator.

11. The device of claim 8 wherein said image processor controls a "click" function in response to said image processor detecting the presence and absence of a relief object image generated by said relief object generator.

12. The device of claim 8 wherein said image processor controls a "double click" function in response to said image processor detecting a presence, absence, and renewed presence of a relief object image generated by said relief object generator.

13. The device of claim 8 wherein said image processor controls a cursor movement function in response to movement of a relief object image generated by said relief object generator.

14. The device of claim 1 wherein said image processor provides said generated image data for transmission to a remote site.

15. The device of claim 1 wherein said image processor provides said access granted signal to a remote site.

16. The device of claim 1 wherein said memory is a portable memory.

17. The device of claim 1 wherein said image processor selects computer parameters in correspondence with changes in said relief object image generated by said relief object image generator.

18. The device of claim 1 wherein said image processor controls computer parameters in correspondence with changes in said relief object image generated by said relief object image generator.

19. The device of claim 1 wherein said image processor activates special functions in correspondence with changes in said relief object image generated by said relief object image generator.

20. The device of claim 19 wherein said special function is a drag function.

21. The device of claim 1 further comprising:
a platen interposed between said electroluminescent device and said sensor array so that said platen is spaced from said electroluminescent device to form a slot whereby an object to be imaged may be positioned proximate said platen;
an external light source proximate a rear surface of said sensor array; and
said sensor array having a partially-transparent substrate and spaced apart sensor elements that permit light from said external light source to reach said platen so that said object to be imaged positioned proximate said platen may be illuminated by light from said external light source and imaged by said sensor array.

22. The device of claim 1 further comprising:
a platen interposed between said electroluminescent device and said sensor array, said electroluminescent device being movably mounted so that said electroluminescent device may be moved to expose said platen;
an external light source proximate a rear surface of said sensor array;
said sensor array having a partially-transparent substrate and spaced apart sensor elements that permit light from said external light source to reach said platen so that said objects positioned proximate said platen may be illuminated by light from said external light source and imaged by said sensor array.

23. The device of claim 1 further comprising:
a platen interposed between said electroluminescent device and said sensor array;
a biasing member coupled to one of said electroluminescent device and said platen to urge said electroluminescent device and said platen together, said one of said electroluminescent device and said platen coupled to said biasing member being displaceable so an object to be imaged may be placed between said electroluminescent device and said platen;
an external light source proximate a rear surface of said sensor array; and
said sensor array having a partially-transparent substrate and spaced apart sensor elements that permit light from said external light source to reach said platen so that said objects placed against said platen may be illuminated by light from said external light source and imaged by said sensor array.

24. The device of claim 1 further comprising:
a platen interposed between said electroluminescent device and said sensor array;
a biasing member coupled to said electroluminescent device and said platen to urge said electroluminescent device and said platen together, said electroluminescent device and said platen being displaceable so an object to be imaged may be placed between said electroluminescent device and said platen;
an external light source proximate a rear surface of said sensor array; and
said sensor array having a partially-transparent substrate and spaced apart sensor elements that permit light from said external light source to reach said platen so that said objects placed against said platen may be illuminated by light from said external light source and imaged by said sensor array.

25. The device of claim 1 further comprising:
a conductive stylus coupled to said alternating current source so that a point of said stylus contacting said electroluminescent device generates images of said stylus point.

26. The device of claim 25 wherein said image processor generates a composite image from a series of images.

27. The device of claim 25 wherein
said pressure-variable impedance layer overlaying said electroluminescent device provides that pressure from said point of said stylus generates an image of said stylus point.

28. A method for controlling access to a resource comprising the steps of:
generating an image of a relief object with a single electrode electroluminescent device coupled to an alternating current source;
insulating said relief object from said alternating current with a pressure-variable impedance coating over said single electrode electroluminescent device;
generating increases in current to said single electrode electroluminescent device in correspondence with pressure applied by said relief object to said pressure-variable impedance coating;
converting said generated image to image data; and
generating an access granted signal in response to said image data corresponding to authorization image data.

29. The method of claim 28 further comprising the steps of:
transferring said image generated by said single electrode electroluminescent device to said sensor array through optical elements interposed between said sensor array and said single electrode electroluminescent device.

30. The method of claim 28 further comprising the steps of:

maintaining said alternating current source of said single electrode electroluminescent device in an active state while a computer coupled to said relief object image generator is in an "off" state; and said generating step generating said access granted signal in response to said generated image data corresponding to said stored image data while said computer coupled to said single electrode electroluminescent device remains in said "off" state.

31. The method of claim 30 further comprising the steps of:

applying power to said computer in response to said access granted signal.

32. The method of claim 31 further comprising the step of:

selecting predetermined configuration data corresponding to said generated image data in response to said power being applied to said computer.

33. The method of claim 28 further comprising the step of:

communicating said access granted signal to said computer coupled to said access control device through a communication link.

34. The method of claim 32 further comprising the step of:

communicating said predetermined configuration data to said computer coupled to said access control device through a communication link.

35. The method of claim 28 further comprising the step of:

retrieving said authorization data from a portable memory.

36. The method of claim 28 further comprising the steps of:

controlling a computer function in response to changes in said image data.

37. The method of claim 28 further comprising the step of:

controlling computer functions in correspondence with changes in said relief object image generated by said single electrode electroluminescent device.

38. The method of claim 36 wherein said controlling step controls said computer functions in correspondence with changes in at least two relief object images generated by said single electrode electroluminescent device.

39. The method of claim 36 said controlling computer function step further comprising:

controlling a "click" function in response to detection of a presence and absence of a relief object image generated by said single electrode electroluminescent device.

40. The method of claim 36 said controlling computer function step further comprising:

controlling a "double click" function in response to detection of a presence, absence, and renewed presence of a relief object image generated by said single electrode electroluminescent device.

41. The method of claim 36 said controlling computer function step further comprising:

controlling a cursor movement function in response to movement of a relief object image generated by said single electrode electroluminescent device.

42. The method of claim 28 further comprising the step of:

transmitting said image data to a remote site for authorization verification.

43. The method of claim 28 further comprising the step of:

transmitting said access granted signal to a remote site for authorization verification.

44. The method of claim 28 further comprising the step of:

selecting computer parameters in correspondence with changes in said relief generated by said single electrode electroluminescent device.

45. The method of claim 28 further comprising the step of:

controlling computer parameters in correspondence with changes in said relief object image generated by said single electrode electroluminescent device.

46. The method of claim 28 further comprising the step of:

activating special functions in correspondence with changes in said relief object image generated by said single electrode electroluminescent device.

47. The method of claim 46 wherein said activating step activates a drag function.

48. The method of claim 28 further comprising the step of:

interposing a platen between said electroluminescent device and said sensor array so that said platen is spaced from said electroluminescent device to form a slot whereby an object to be imaged may be positioned proximate said platen; and illuminating said platen with an external light source located behind said sensor array, said sensor array having a partially-transparent substrate and spaced apart sensor elements that permit light from said external light source to reach said platen so that said objects placed against said platen may be illuminated by light from said external light source and imaged by said sensor array.

49. The method of claim 28 further comprising the steps of:

interposing a platen between said electroluminescent device and said sensor array;

movably mounting said electroluminescent device so that said electroluminescent device may be moved to expose said platen; and illuminating said platen with an external light source located behind said sensor array, said sensor array having a partially-transparent substrate and spaced apart sensor elements that permit light from said external light source to reach said platen so that said objects placed against said platen may be illuminated by light from said external light source and imaged by said sensor array.

50. The method of claim 28 further comprising the steps of:

interposing a platen between said electroluminescent device and said sensor array;

biasing one of said electroluminescent device and said platen to urge said electroluminescent device and said platen together, said biased one of said electroluminescent device and said platen being displaceable so an object to be imaged may be placed between said electroluminescent device and said platen; and illuminating said platen with an external light source located behind said sensor array, said sensor array having a partially-transparent substrate and spaced apart sensor elements that permit light from said external light source to reach said platen so that said objects placed against said platen may be illuminated by light from said external light source and imaged by said sensor array.

51. The method of claim 28 further comprising the steps of:

interposing a platen between said electroluminescent device and said sensor array;

biasing said electroluminescent device and said platen to urge said electroluminescent device and said platen together, said biased electroluminescent device and said platen being displaceable so an object to be imaged may be placed between said electroluminescent device and said platen; and illuminating said platen with an external light source located behind said sensor array, said sensor array having a partially-transparent substrate and spaced apart sensor elements that permit light from said external light source to reach said platen so that said objects placed against said platen may be illuminated by light from said external light source and imaged by said sensor array.

52. The method of claim 28 further comprising the step of:

coupling a conductive stylus to said alternating current source so that a point of said stylus contacting said electroluminescent device generates images of said stylus point.

53. The method of claim 52 further comprising the step of:

generating a composite image of said stylus movement from a series of said images of said stylus point.

54. The method of claim 52, further comprising the step of:

overlaying said electroluminescent device with the pressure-variable impedance layer so that pressure from said point of said stylus generates an image of said stylus point.

55. A device for controlling access to computer resources comprising:

means for generating images of a relief object;

means for insulating said relief object from an alternating current source and for generating increases in current to said image generating means in correspondence with pressure applied by said relief object to said insulating means;

means for converting said relief object image to relief object image data; and means for generating an access granted signal in response to said relief object image data corresponding to authorization image data whereby a user may access a computer and its resources.

56. The device of claim 55 further comprising:

means for transferring said image generated by said image generating means to said converting means.

57. The device of claim 55 further comprising:

means for retrieving said authorization image data from a portable memory.

58. The device of claim 55 further comprising:

means for applying power to said computer in response to said access granted signal.

59. The device of claim 58 further comprising:

means for selecting predetermined configuration data corresponding to said generated image data in response to said power applying means applying power to said computer.

60. The device of claim 55 further comprising:

means for communicating said access granted signal through a communication link to said computer coupled to said access control device.

61. The device of claim 59 further comprising:

means for communicating said predetermined configuration data through a communication link to said computer coupled to said access control device.

62. The device of claim 55 further comprising:

means for controlling a computer function in response to changes in said relief object image data.

63. The device of claim 62 wherein said controlling means controlling computer functions in correspondence with changes in said relief object image.

64. The device of claim 62 wherein said controlling computer function means controls said computer functions in correspondence with changes in at least two relief object images.

65. The device of claim 62 wherein said controlling means controls a "click" function in response to detection of a presence and absence of a relief object image generated by said relief object imaging means.

66. The device of claim 62 wherein said controlling means controls a "double click" function in response to detection of a presence, absence, and renewed presence of a relief object image generated by said relief object generator.

67. The device of claim 62 wherein said controlling means controls a cursor movement function in response to movement of a relief object image generated by said relief object generator.

68. The device of claim 55 further comprising:

means for transmitting said image data to a remote site for authorization verification.

69. The device of claim 55 wherein said signal generating means includes:

means for selecting computer parameters in correspondence with changes in said relief object image.

70. The device of claim 55 further comprising:

means for controlling computer parameters in correspondence with changes in said relief object image data.

71. The device of claim 55 further comprising:

means for activating special functions in correspondence with changes in said relief object image data.

72. The device of claim 71 wherein said activating means activates a drag function.

73. The device of claim 55 further comprising:

means for supporting an object to be imaged, said supporting means being interposed between an electroluminescent device of said image generating means and a sensor array so that said supporting means is spaced from said electroluminescent device to form a slot whereby an object to be imaged may be positioned proximate said supporting means;

said converting means having a partially-transparent substrate and spaced apart sensor elements that permit light to reach said supporting means; and an illuminating means so that objects to be imaged placed against said supporting means may be illuminated by light passing through said converting means.

74. The device of claim 55 further comprising:

means for supporting an object to be imaged, said supporting means being interposed between an electroluminescent device of said imaging means and a sensor array;

said image generating means being movably mounted so that so that said electroluminescent device may be moved to expose said supporting means;

said converting means having a partially-transparent substrate and spaced apart sensor elements that permit light to reach said supporting means; and an illuminating means so that objects to be imaged placed against said supporting means may be illuminated by light passing through said converting means.

75. The device of claim 55 further comprising:

means for supporting an object to be imaged, said supporting means being interposed between said electroluminescent device and said sensor array;

one of said image generating means and said supporting means being biased to urge said image generating means and said supporting means together, said biased one of said image generating means and said supporting means being displaceable so an object to be imaged may be positioned between said image generating means and said supporting means;

said converting means having a partially-transparent substrate and spaced apart sensor elements that permit light to reach said supporting means; and an illuminating means so that objects to be imaged placed against said supporting means may be illuminated by light passing through said converting means.

76. The device of claim 55 further comprising:

means for supporting an object to be imaged, said supporting means being interposed between said electroluminescent device and said sensor array;

said image generating means and said supporting means being biased to urge said image generating means and said supporting means together, said image generating means and said supporting means being displaceable so an object to be imaged may be positioned between said image generating means and said supporting means;

said converting means having a partially-transparent substrate and spaced apart sensor elements that permit light to reach said supporting means; and an illuminating means so that objects to be imaged placed against said supporting means may be illuminated by light passing through said converting means.

77. The device of claim 55 further comprising:

conductive means for writing coupled to said imaging means so that said imaging means generates images of said writing means as said writing means contacts said imaging means.

78. The device of claim 77 wherein said means for generating an access granted signal generates a composite image of movement of said writing means from a series of images of said writing means.

79. The device of claim 77 further comprising:

means for converting pressure from said means for writing to current so that said imaging means generates an image of said writing means.

\* \* \* \* \*